United States Patent
Chang et al.

(10) Patent No.: US 7,650,540 B2
(45) Date of Patent: Jan. 19, 2010

(54) DETECTING AND DIFFERENTIATING SATA LOOPBACK MODES

(75) Inventors: Luke L. Chang, Marlboro, MA (US); Pak-Lung Seto, Shrewsbury, MA (US); Naichih Chang, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 565 days.

(21) Appl. No.: 11/490,892

(22) Filed: Jul. 21, 2006

(65) Prior Publication Data

US 2008/0019280 A1    Jan. 24, 2008

(51) Int. Cl.
G01R 31/28    (2006.01)
(52) U.S. Cl. .............................. 714/716; 714/5; 714/30; 714/43; 714/56; 714/799; 714/712; 714/718; 714/719; 714/735; 365/201; 375/224; 370/241; 370/249
(58) Field of Classification Search ........................ None
See application file for complete search history.

(56) References Cited

U.S. PATENT DOCUMENTS

| | | | | |
|---|---|---|---|---|
| 7,017,087 B2 * | 3/2006 | Panis et al. | ................ | 714/716 |
| 7,178,054 B2 * | 2/2007 | Seto et al. | ...................... | 714/5 |
| 7,444,558 B2 * | 10/2008 | Mitbander et al. | ........... | 714/716 |
| 2003/0081743 A1 * | 5/2003 | Chiang et al. | ............. | 379/93.08 |
| 2004/0076119 A1 | 4/2004 | Aronson et al. | | |
| 2005/0079822 A1 * | 4/2005 | Boose et al. | ............... | 455/67.11 |
| 2005/0154946 A1 | 7/2005 | Mitbander et al. | | |
| 2005/0186832 A1 * | 8/2005 | Nemazie | ..................... | 439/378 |

FOREIGN PATENT DOCUMENTS

EP    0726160 B1    12/2002
WO    2008011326 A1    1/2008

OTHER PUBLICATIONS

High Speed Serialized At Attachment, Serial ATA International Organization: Serial ATA Revision 2.5, 594 pgs., Oct. 27, 2005.*
International Search Report and Written Opinion of the International Searching Authority; Mailed Nov. 27, 2007 ; PCT/US2007/073346, 10 pages.
PCI Express Base Specification Revision 1.0, Jul. 22, 2002, 428 pgs.
PCI-X Addendum to the PCI Local Bus Specification Revision 1.0a, Jul. 24, 2000 PCI Special Interest Group, 240 pgs.
International Preliminary Report on Patentability for PCT Patent Application No. PCT/US2007/073346, Mailed on Feb. 5, 2009, 6 pages.

* cited by examiner

*Primary Examiner*—John P Trimmings
(74) *Attorney, Agent, or Firm*—Grossman, Tucker, Perreault & Pfleger, PLLC

(57) ABSTRACT

A method according to one embodiment may include communicating, by a far end device with a near end device, using a Serial ATA (SATA) communications protocol; receiving, by the far end device, a SATA signal sequence having two bits, the state of which define at least one loopback mode; defining, by the far end device, a reserved and/or error state if both of the bits are set; and processing, by the far end device, the two bits together to determine if the two bits are in a state that defines at least one loopback mode or if the two bits are set. Of course, many alternatives, variations, and modifications are possible without departing from this embodiment.

30 Claims, 6 Drawing Sheets

| LBit | F Bit | Definition |
|---|---|---|
| 0 | 0 | Far End Does Not Enter Loopback |
| 0 | 1 | Far End Enters Far-End Analog |
| 1 | 0 | Far End Enters Far-End Retimed |
| 1 | 1 | Reserved / Error Condition |

DETECTING AND DIFFERENTIATING SATA LOOPBACK MODES

FIELD

The present disclosure relates to detecting and differentiating SATA loopback modes.

BACKGROUND

Loopback testing is one of the easiest and quickest ways to conduct diagnostic tests for the purpose of debugging design or connectivity bugs. This methodology has been widely used in the electronics industry for a long time, such as for remote fault isolation in the field. It has also resulted in significant reduction of product or equipment downtime. The latest SATA specification (Revision 2.5 and dated Oct. 27, 2005) specifies three loopback modes for a SATA device (host, device, tester), namely far-end retimed loopback, far-end analog, and near-end analog.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Figure 1:
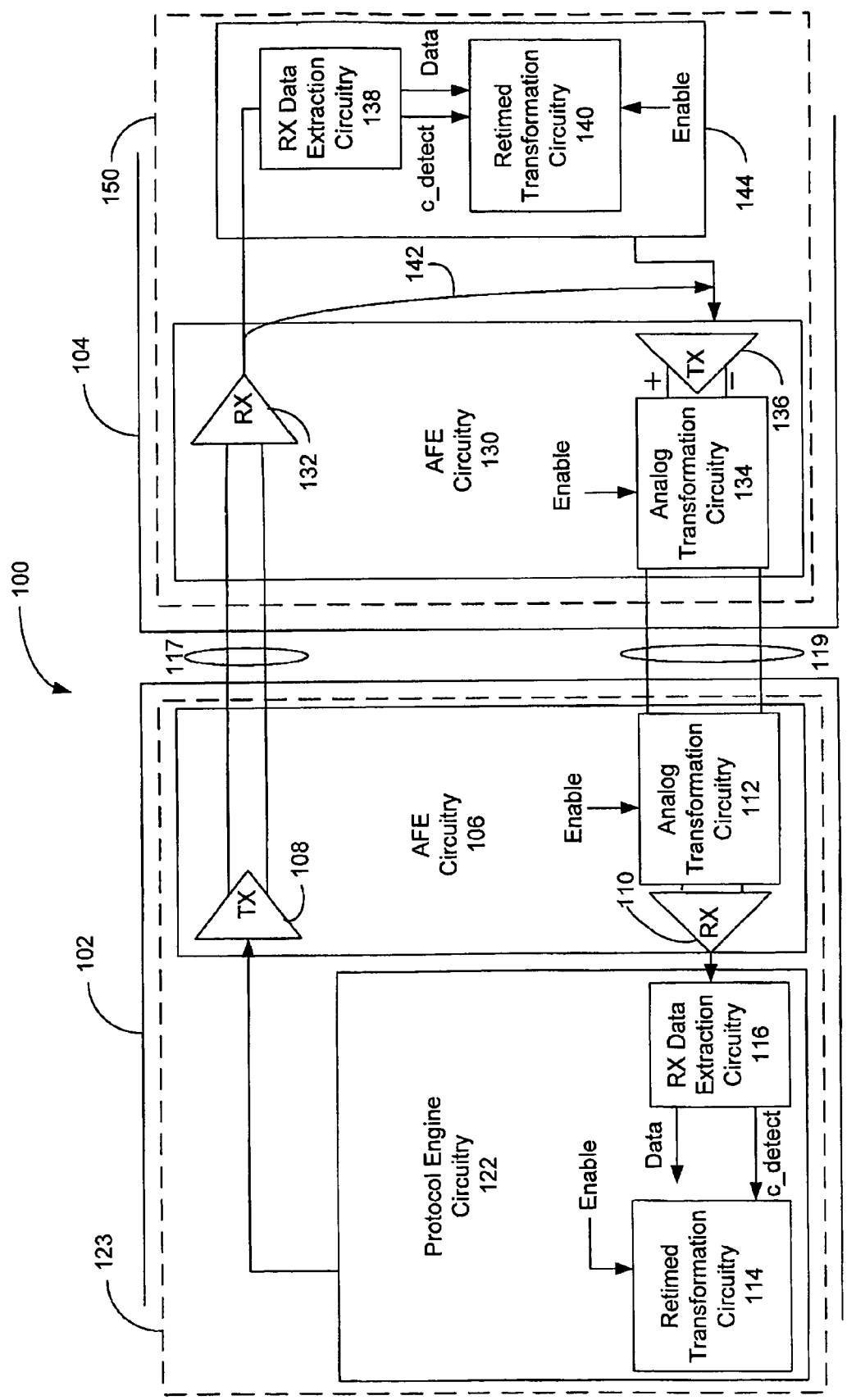
FIG. 1 is a diagram illustrating one exemplary embodiment.

FIG. 1 is a diagram illustrating one exemplary system embodiment 100. This embodiment may include a near end device 102 and a far end device 104 in communication with one another. The near end device 102 may include, for example, a host initiator. The far end device 104 may include, for example, one or more Serial ATA (SATA) devices (for example, one or more SATA disk drives) and/or tester equipment. The near end device 102 may include protocol engine circuitry 122 capable of communicating using a plurality of communication protocols. In at least one embodiment, protocol engine circuitry 122 may be capable of exchanging commands and data with the far end device 104 using a Serial Advanced Technology Attachment (SATA). If a SATA communications protocol is used by protocol engine circuitry 122 to communicate with the far end device 104, it may comply or be compatible with the protocol described in "Serial ATA: High Speed Serialized Attachment," Revision 2.5, published Oct. 27, 2005 by the Serial ATA Working Group, and/or earlier and/or later revisions of this communications protocol. Accordingly, the far-end device 104 may similarly be capable of communicating with the near end device 102 using the aforementioned SATA communications protocol.

The near end device 102 may also include analog front end (AFE) circuitry 106 that may include transmit circuitry (TX) 108 configured to generate a serial data stream and to transmit the data to the far end device 104. To that end, protocol engine circuitry 122 may be capable of generating parallel data which may then be clocked and serialized by TX circuitry 108. AFE circuitry 106 may also include receive circuitry (RX) 110 capable of de-serializing received data (for example, serial data received from the far end device 104). Protocol engine circuitry 122 may include RX data extraction circuitry 116 configured to generate parallel data from the serial data stream received via the RX circuitry 110. The parallel data may be stored in an elastic buffer memory (not shown), for example an elastic first-in-first-out (FIFO) buffer memory.

Far end device 104 may include controller circuitry 144 capable of exchanging commands and data with the far-end device 104 using the aforementioned SATA communications protocol. Similar to the AFE 106 of the near end device 102, the far-end device 104 may also include AFE circuitry 130 that may include corresponding transmit circuitry TX 136 and receive circuitry RX 132 (which may operate similarly to the transmit and receive circuitry in the AFE 106). Control circuitry 144 may include RX data extraction circuitry 138 (similar to RX data extraction circuitry 116) configured to generate parallel data from the serial data stream received via the RX circuitry 132. The parallel data may be stored in an elastic buffer memory (not shown), for example an elastic first-in-first-out (FIFO) buffer memory. Also, controller circuitry 144 may be capable of generating parallel data which may then be clocked and serialized by TX circuitry 136. Communications links 117 and 119 may be provided to support differential communication signals between respective TX and RX circuitry 108/132 and 136/110. Of course, AFE circuitry 106 and 130 may also comply or be compatible with the aforementioned SATA communications protocol.

Protocol engine circuitry 122 may be capable of entering into one or more loopback modes with the far-end device 104. A loopback mode may be used for testing and/or debugging purposes. As stated above, the SATA communications protocol may support three loopback modes: 1) a far-end retimed loopback mode, 2) a far-end analog loopback mode, and 3) a near-end analog loopback mode. During a far end retimed loopback mode, protocol engine circuitry 122 may send test data to controller circuitry 144. The test data may be extracted by RX data extraction circuitry 138, re-clocked (retimed) and sent back to protocol engine circuitry 122. This operation may be capable of testing the data transmission integrity and/or physical connection integrity between the protocol engine circuitry 122 and the controller 144. During a far end analog loopback mode, protocol engine circuitry 122 may send test data along path 142, i.e., serialization of the test data via TX circuitry 132 and de-serialization of the test data via RX circuitry 138. This operation may be capable of testing the integrity of the AFE 130 of the far end device 104. During a near end analog loopback mode, a loop may be created between the TX circuitry 108 and the RX circuitry 110 to test the AFE 106 of the near-end device 102.

Figures 2, 3:
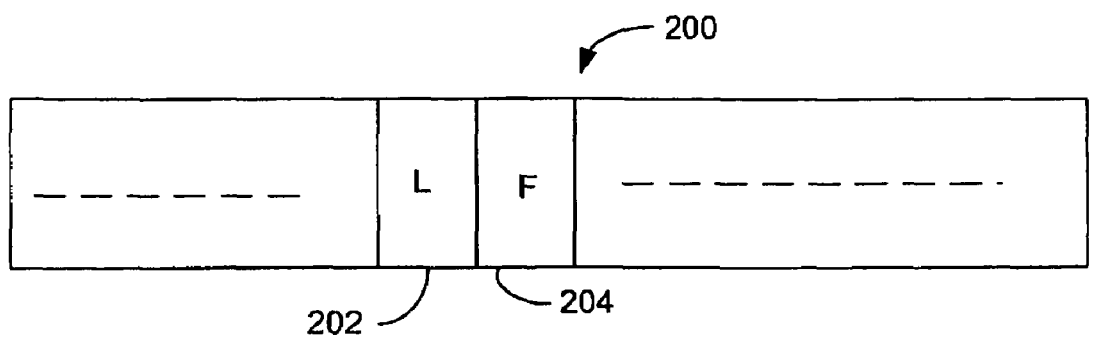
FIG. 2 illustrates an exemplary SATA BIST activate FIS.
FIG. 3 is a table of exemplary bit states of a SATA BIST activate FIS frame.

In accordance with SATA protocol, protocol engine circuitry 122 may transmit, during an SATA out-of-band (OOB) signal sequence, predetermined, special primitive signal sequence that may comprise, e.g., a predetermined comma character, such as, a K28.5 character. To enter into a far-end loopback mode (retimed and/or analog), protocol engine circuitry 122 may be configured to send a BIST (built-in self-test) Activate FIS (frame information structure) signal sequence to the far-end device 104. The BIST Activate FIS may cause AFE circuitry 130 and/or controller 144 to enter one of the far-end loopback modes (e.g., retimed and/or analog). FIG. 2 illustrates an exemplary SATA BIST activate FIS signal sequence 200. The BIST activate FIS signal sequence may include a plurality of bits, and according to the SATA protocol, may include an "L" bit 202 and an "F" bit 204. Depending on the state of the L and F bits, a far-end loopback retimed mode or a far-end loopback analog mode may be entered. Once the BIST Activate FIS is sent to the far end device, a test data stream may be sent to the far end device, which may comply or be compatible with the aforementioned SATA communications protocol.

For example, FIG. 3 depicts a table 300 of exemplary bit states for the L bit 202 and F bit 204 of a SATA BIST activate FIS frame. In the aforementioned SATA communications protocol, if the L and F bits are both a binary "0", controller 144 and/or AFE circuitry 130 may interpret this state to not enter any far end loopback mode. If the F bit is set ("1") and L bit is unset ("0"), this may cause AFE circuitry 130 to enter a far end analog loopback mode. If the L bit is set ("1") and the F bit is unset ("0"), this may cause controller 144 to enter into a far end retimed loopback mode. The previous three states of the L and F bits (i.e., 00, 01 and 1 0) are defined in the aforementioned SATA communications protocol. However, if an error occurs during transmission of the BIST Activate FIS, a 1 1 state for the L and F bits may occur, which is undefined in the SATA communications protocol and may cause the far end device to behave unpredictably.

Accordingly, in at least one embodiment, the far end device may be configured to create a reserved/error state for the BIST Activate FIS signal sequence that is otherwise undefined by the aforementioned SATA standard. In the aforementioned conventional SATA communications protocol, the L and F bits are processed separately, which may lead to unpredictable behavior if both bits are set. Accordingly, the far end device 104 may be configured to create a reserved/error state for the case when a 1 and 1 are received for the L and F bits, respectively. This is depicted as the last for 302 of FIG. 3. Also, the far end device 104 may be configured to process the L and F bits together when a BIST Activate FIS is received. This may allow the far end device 104 to determine, for example, if both the L and F bits are set (rather than causing unpredictable responses by the far end device when these bits are processed separately). The far end device 104 may be further configured to compare the respective states of the L and F bits to determine if: 1) not to enter a far end loopback mode (e.g., 0 0), 2) enter one of the far end loopback modes (e.g., 0 1 or 1 0), or 3) recognize a reserved and/or error condition (e.g., 1 1). The 1 1 state may correspond to an error state or a reserved state. The reserved state may be defined by a future application and/or future revisions of the aforementioned SATA communications protocol.

If the 1 1 state is received by the far end device 104 and the 1 1 state is defined by the far end device 104 as an error condition, the far end device 104 may be configured to respond by sending a SATA-defined error primitive back to the near end device 102. For example, an R_ERRp primitive sequence may be sent by the far end device 104 in response to an error condition on the L and F bits. This may enable, for example, the near end device 102 to collect and report error statistics to a host system.

Figure 4:
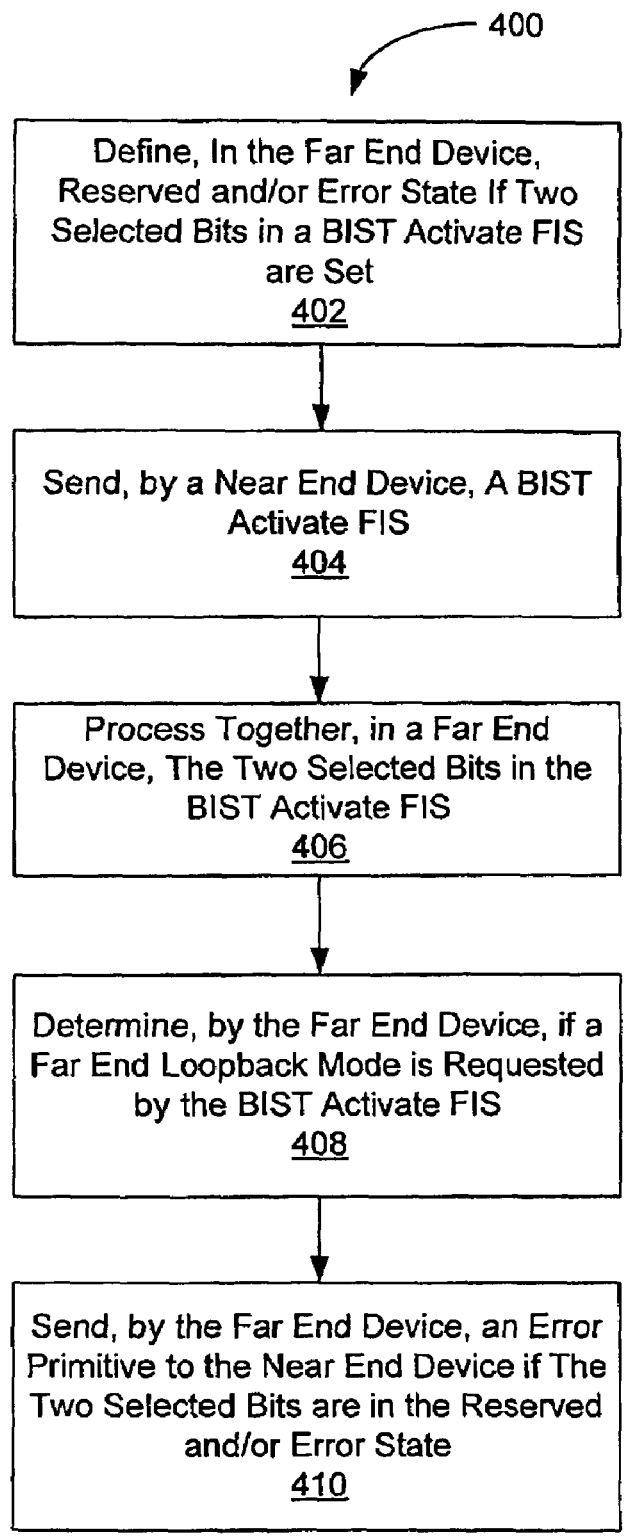
FIG. 4 depicts a flowchart of operations according to one embodiment.

FIG. 4 depicts a flowchart 400 of operations according to one embodiment. Operations may include defining, in the far end device, a reserved and/or error state for if two selected bits in a BIST Activate FIS are set 402. Operations may further include sending, by a near end device, a BIST Activate FIS. 404. Operations may additionally include processing together, in the far end device, the two selected bits in the BIST Activate FIS 406. Operations may additionally include determining, by the far end device, if a far end loopback mode is requested by the BIST Activate FIS 408. If a far end loopback mode is not being requested by the BIST Activate FIS, operations may additionally include sending, by the far end device, an error primitive to the near end device, if the two selected bits are in the reserved and/or error state 410.

In another aspect, the present disclosure provides for differentiating among the different loopback modes. For example, if the L and F bits (associated with the BIST Activate FIS) are sent to the far end device 104 by the near end device 102, an error may occur during transmission which may cause the L and/or F bits to flip state (i.e., a "0" becomes a "1" or vice-versa). This may cause the far end device to enter a far end loopback mode that is incorrect. For example, if the near end device 102 sends a BIST Activate FIS having the F bit set and the L bit unset, this may be an indication that the near end device 102 is requesting that the far end device 104 enter into a far end analog loopback mode (see FIG. 3). If, during transmission of this BIST Activate FIS the L and F bits become flipped (i.e., the L bit becomes set and the F bit becomes unset), the far end device 104 may respond by entering into a far end retimed loopback mode. Thus, the near end device 102 may receive data from the far end device 104 that is unexpected, since the loopback mode that the far end device enters is not the loopback mode requested by the near end device.

Accordingly, and referring again to FIG. 1, to differentiate a far-end retimed loopback mode from the other loopback modes, this embodiment may additionally include near end retimed transformation circuitry 114 in the near end device 102 and far end retimed transformation circuitry 140 in the far end device 104. Circuitry 114 and 140 may generally provide inverse data transformation operations so that an original data stream sent by the near end device 102 to the far end device 104 during a retimed loopback mode may be recovered in the near end device (after being transformed in the far end device 104). Thus, for example, retimed transformation circuitry 140 may be configured to perform the following data transformation operation: X->f(X)->Y; where X is the original data stream sent by the near end device 102, f(X) may be a generalized function, performed by the far end device, that transforms the original data, and Y is the resulting data stream that is sent back to the near end device. Similarly, retimed transformation circuitry 114 may be configured to perform the following data transformation operation: Y->f(Y)->X; where Y is the transformed data stream sent by the far end device 104, f(Y) may be a generalized function, performed by the near end device, that recovers the original data stream from the transformed data, and X is the resulting original data stream sent by near end device 102.

In one exemplary embodiment, retimed transformation circuitry 140 and 114 may comprise matched near end and far end XOR circuitry configured to XOR the de-serialized data after it is extracted from a respective AFE. In other words, the XOR circuitry 114 and 140 may XOR the parallel data that may be obtained after operations performed by respective RX data extraction circuitry 116 and 138. In one exemplary embodiment, retimed transformation circuitry 114 and 140 may XOR the associated data with all 1's. It should be noted that XORing a data stream with all "1"s using XOR circuitry 140, and then XORing again with all "1"s using XOR circuitry 114 may operate to recover the original data sent by protocol engine circuitry 122.

In operation, and assuming a BIST Activate FIS is sent by protocol engine circuitry 122 having the L bit set and the F bit unset (e.g., far-end retimed loopback mode), protocol engine circuitry 122 may enable retimed transformation circuitry 114 and await a response from the far end device 104. If the far end device 104 receives the request to enter into a far end retimed loopback mode (by processing the L and F bits and determining the state of those bits, as described above), controller circuitry 144 may enable retimed transformation circuitry 140. The near end device may send a test data stream, via TX 108 and RX 132. When the test data stream is received by controller 144, retimed transformation circuitry 140 may perform an XOR operation on the parallel test data. Controller 144 may send the parallel data stream, modified by the retimed transformation circuitry 140, to the near end device 102, via TX 136 and RX 110. Upon receipt of the data from the far end device 104, retimed transformation circuitry 114 associated with the near end device 102 may perform an XOR operation. If the far end device 104 has entered the correct loopback mode (in this example, the far-end retimed loopback mode) and enabled the far end retimed transformation circuitry 140, the XOR operations performed by retimed transformation circuitry 114 may extract the original data sent by the near end device 102. This may confirm that the far end device 104 has entered the correct loopback mode, as requested by the near end device 102 in the BIST activate FIS.

If, however, the far end device 104 does not receive the correct information in the L and F bits of the BIST Activate FIS, the far end device 104 may not enable the far end retimed transformation circuitry 140. In this case, the data sent back to the near end device 102 may be XORed by retimed transformation circuitry 114 without being XORed by retimed transformation circuitry 140. This may flag an error in the near end device 102 that the far end device has not entered into the correct loopback mode. The near end device 102 may attempt to retry the retimed loopback mode and/or collect and report error statistics which may be reported to a host system.

To determine if the far end device 104 includes retimed transformation circuitry 140 to support the operations described above, the near end device 102 may send a frame to the far end device 104, for example, prior to sending the BIST Activate FIS. For example, the near end device 102 may send a SATA IDENTIFY DEVICE and SET Features commands to the far end device 104 to determine, among other things, if the far end device 104 includes support for a retimed transformation strategy. A selected number of bits of reserved words 78 and 79 in this frame may be used for this purpose. In response, the far end device 104 may set a selected Reserved bit in an IDENTIFY DEVICE response frame to indicate if the far end device includes the retimed transformation circuitry 140 to support retimed transformation operations to differentiate the far end retimed loopback mode. Once the loopback mode is completed the near end device and far end device may disable respective retimed transformation circuitry 114 and 140.

As is specified by the aforementioned SATA communications protocol, an ALIGNp primitive may be used to establish dword synchronization between the near end and far end devices. However, the first character of the ALIGNp primitive may include a comma character (e.g., K28.5 character). To maintain proper synchronization between the near end device and the far end device, the comma character in the ALIGNp primitive may be left unmodified by the retimed transformation circuitry 140. Accordingly, AFE circuitry 130 may be configured to notify the retimed transformation circuitry 140 that a comma character has been detected (c_detect). For example, for each 10-bit character processed, AFE circuitry 130 may assert an associated signal to indicate whether the character is a comma or data (K or D). Alternatively or additionally, AFE circuitry 130 may force dword alignment by putting the comma character in the first 10 bits of the parallel 40-bit data output of RX data extraction circuitry 138. Subsequent characters may be loaded in the order of receipt. In the event that two comma characters are received in a row, the second one may overwrite the first. An exemplary serial RX stream is depicted in Table 1 below. In this example, C=K28.5 comma character and D=data character, where time progresses forward from T1 to T10:

TABLE 1

Serial RX Stream with Comma Character and Data

| | Time Slot | | | | | | | | | |
|---|---|---|---|---|---|---|---|---|---|---|
| | T1 | T2 | T3 | T4 | T5 | T6 | T7 | T8 | T9 | T10 |
| RX Stream | D1 | D2 | C1 | D3 | D4 | C2 | C3 | D5 | D6 | D7 |

In this example, RX data extraction circuitry 138 may output parallel 40-bit RX data depicted in Table 2 below, where X means "unknown".

TABLE 2

Tracking of Comma Character in Parallel 40-bit RX Stream

| 40-bit RX Data | Time Slot: T2 | Time Slot: T5 | Time Slot: T6 | Time Slot: T10 |
|---|---|---|---|---|
| [0:9] | D1 | C1 | C2 | C3 (not XORed by far end and near end) |
| [10:19] | D2 | D3 | X | D5 (XORed by far end and near end) |
| [20:29] | X | D4 | X | D6 (XORed by far end and near end) |
| [30:39] | X | X | X | D7 (XORed by far end and near end) |

At time slot T10, the RX data extraction circuitry 138 may detect the last comma character C3 and may force it into the first byte of the 40-bit parallel data (over-writing the previous C1 and C2). RX data extraction circuitry 138 may indicate these operations by sending a c_detect signal to the retimed transformation circuitry 140. If retimed transformation circuitry 140 detects the c_detect signal being asserted, it may pass through bits [0:9] of the input data without XORing these bits with all 1's. Therefore, in the last column of Table 2 above, C3 may not be XORed with all 1's by XOR circuitry 140, but D5 through D7 may be XORed by XOR circuitry 140. The near end device 102 may be configured in a similar manner to detect comma characters in order to maintain dword synchronization with the far end device and to recover the appropriate data from the retimed transformation circuitry 114.

Figure 5:
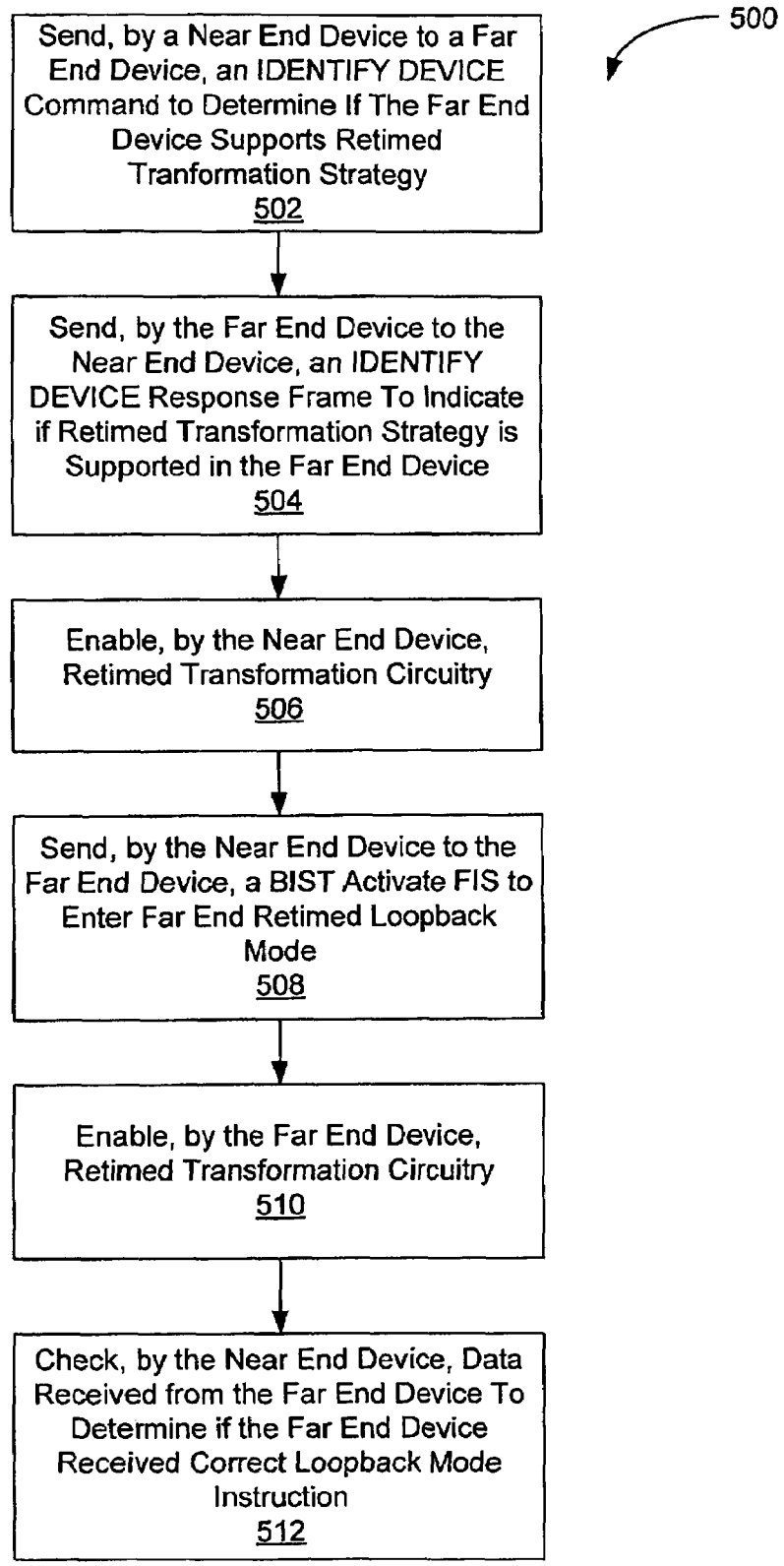
FIG. 5 depicts a flowchart of operations according to another embodiment.

FIG. 5 is flowchart of exemplary operations 500 according to another embodiment. Operations may include sending, by a near end device to a far end device, an IDENTIFY DEVICE command to determine if the far end device supports retimed transformation strategy to differentiate a retimed loopback mode from other loopback modes 502. In response, operations may also include sending, by the far end device to the near end device an IDENTIFY DEVICE response frame to indicate if the retimed transformation strategy is supported in the far end device 504. If the retimed transformation strategy is supported by the far end device, operations may additionally include enabling, by the near end device, retimed transformation circuitry 506. Operations may additionally include sending, by the near end device to the far end device, a BIST Activate FIS to enter a far end retimed loopback mode 508. If the retimed transformation strategy is supported by the far end device, operations may additionally include enabling, by the far end device, retimed transformation circuitry 510. During retimed loopback operations, operations according to this embodiment may further include checking, by the near end device, data received from the far end device to determine if the far end device received the correct loopback mode instructions (as may be indicated by the BIST Activate FIS) 512.

The foregoing description of XOR operations is provided as one specific example of the retimed transformation circuitry 140 and 114. Of course, it should be understood that other logical and/or analog operations may be used in addition to, or as an alternative to, XOR operations. For example, retimed transformation circuitry 140 and/or 114 may be configured to perform 2's compliment operations and/or logical bit inversion operations and/or other well-known and/or after-developed logical and/or analog operations.

Referring again to FIG. 1, to differentiate far-end analog loopback mode from the other loopback modes, this embodiment may additionally include near end analog transformation circuitry 112 in the near end device 102 and far end analog transformation circuitry 134 in the far end device 104. Circuitry 112 and 134 may generally provide inverse analog transformation operations so that the original analog signals sent by the near end device 102 to the far end device 104 during an analog loopback mode may be recovered in the near end device (after being transformed in the far end device 104). Thus, for example, analog transformation circuitry 134 may be configured to perform the following inverse transformation operation: A->f(A)->B; where A is the original analog sent by the near end device 102 (in response to an analog loopback mode), f(A) may be a generalized inverse transformation function, performed by the far end device, and B is the resulting inverse analog signals that are sent back to the near end device. Similarly, the near end device 102 may be configured to perform the following inverse transformation operation: B->f(B)->A; where B is the transformed analog signals sent by the far end device 104, f(B) may be a generalized inverse transformation function, performed by the near end device 102, that recovers the original analog signals from the transformed analog signals, and A is the resulting original data stream sent by the far end device 104.

In one exemplary embodiment, analog transformation circuitry 140 and 114 may comprise matched near end and far end polarity inversion circuitry 112 and 134 in respective AFE circuitry 106 and 130. Polarity inversion circuitry 134 may be configured to reverse the polarity of the differential signals at the output of TX circuitry 136. Likewise, polarity inversion circuitry 112 may be configured to reverse the polarity of the differential signals at the input of RX circuitry 110.

In operation, and assuming a BIST Activate FIS is sent by protocol engine circuitry 122 having the L bit unset and the F bit set (e.g., far-end analog loopback mode), protocol engine circuitry 122 may enable polarity inversion circuitry 112 and await a response from the far end device 104. If the far end device 104 receives the request to enter into a far end analog loopback mode (by processing the L and F bits together and determining the state of those bits, as described above), controller circuitry 144 may enable analog transformation circuitry 134. The near end device may send a test data stream, via TX 108 and RX 132. When the test data stream is received by AFE circuitry 130, polarity inversion circuitry 134 may perform a polarity inversion operation on the differential signals output by TX circuitry 136. Upon receipt of the data from the far end device 104, analog transformation circuitry 112 associated with the near end device 102 may perform a similar polarity inversion operation on the differential signals output by analog transformation circuitry 134, thus returning the data stream to an original state (i.e., the state before operations performed by analog transformation circuitry 134). If the far end device 104 has entered the correct loopback mode (in this example, the analog loopback mode) and enabled the far end analog transformation circuitry 134, the polarity inversion operations performed by analog transformation circuitry 112 may extract the original data. This may confirm that the far end device 104 has entered the correct loopback mode, as requested by the near end device 102 in the BIST activate FIS.

If, however, the far end device 104 does not receive the correct information in the L and F bits of the BIST Activate FIS, the far end device 104 may not enable the far end analog transformation circuitry 134. In this case, the data sent back to the near end device 102 may be inverted by analog transformation 112 without being inverted by analog transformation 134. This may flag an error in the near end device 102 that the far end device has not entered into the correct loopback mode. The near end device 102 may attempt to retry the analog loopback mode and/or collect and report error statistics which may be reported to a host system.

To determine if the far end device 104 includes analog transformation circuitry 134 to support the operations described above, the near end device 102 may send a frame to the far end device 104, for example, prior to sending the BIST Activate FIS. For example, the near end device 102 may send a SATA IDENTIFY DEVICE and SET Features commands to the far end device 104 to determine, among other things, if the far end device 104 includes support for the analog transformation strategy. A selected number of bits of reserved words 78 and 79 in this frame may be used for this purpose. In response, the far end device 104 may set a selected bit in an IDENTIFY DEVICE response frame to indicate if the far end device includes the analog transformation circuitry 134 to support analog transformation operations to differentiate the far end analog loopback mode. Once the loopback mode is completed the near end device and far end device may disable respective analog transformation circuitry 112 and 134.

Figure 6:
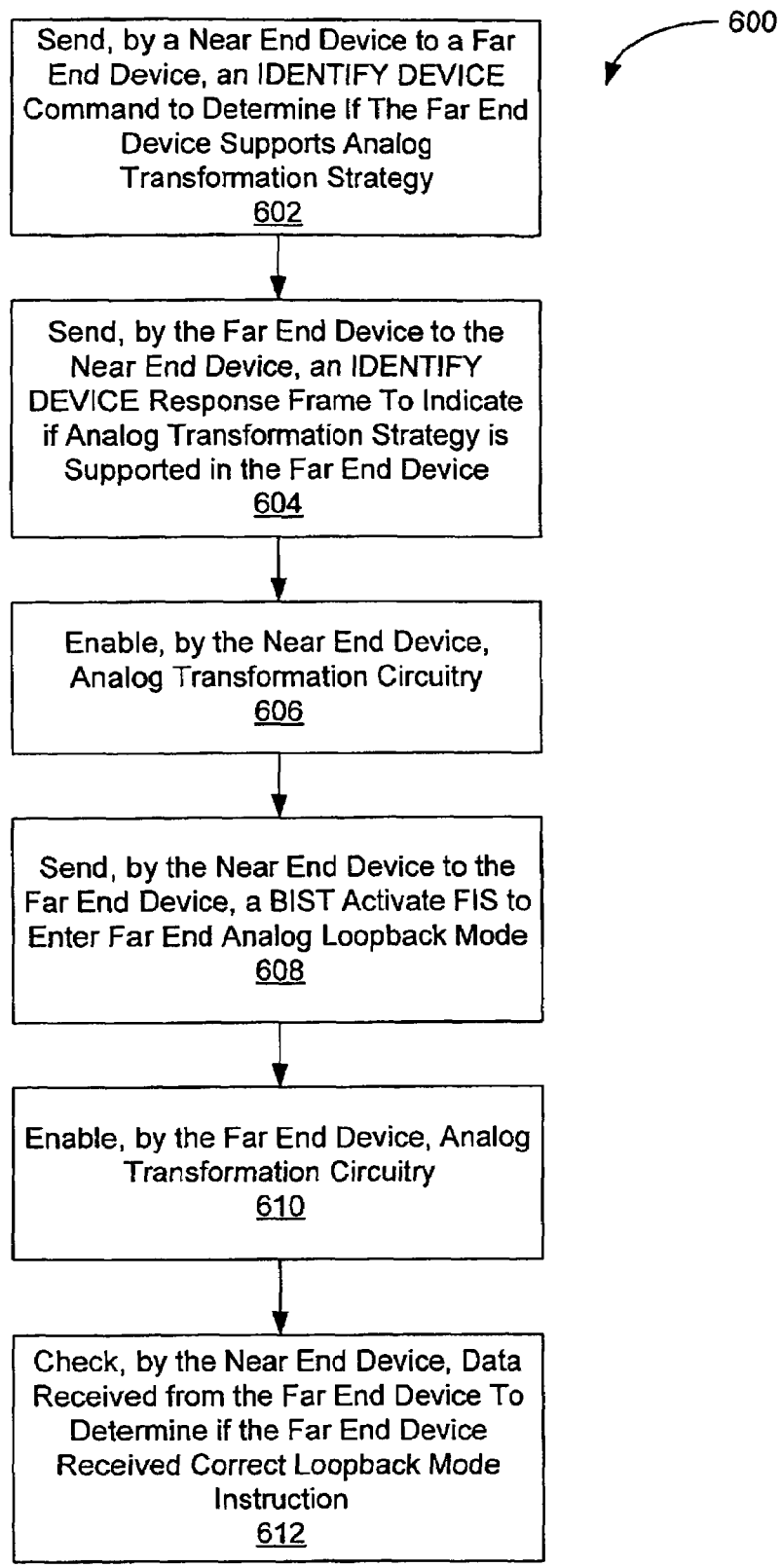
FIG. 6 depicts a flowchart of operations according to yet another embodiment.

FIG. 6 is flowchart of exemplary operations 600 according to another embodiment. Operations may include sending, by a near end device to a far end device, an IDENTIFY DEVICE command to determine if the far end device supports analog transformation strategy to differentiate an analog loopback mode from other loopback modes 602. In response, operations may also include sending, by the far end device to the near end device an IDENTIFY DEVICE response frame to indicate if the analog transformation strategy is supported in the far end device 604. If the analog transformation strategy is supported by the far end device, operations may additionally include enabling, by the near end device, analog transformation circuitry 606. Operations may additionally include sending, by the near end device to the far end device, a BIST Activate FIS to enter a far end analog loopback mode 608. Operations may further include enabling, by the far end device, analog transformation circuitry 610. During analog loopback operations, operations according to this embodiment may further include checking, by the near end device, data received from the far end device to determine if the far end device received the correct loopback mode instructions (as may be indicated by the BIST Activate FIS) 612.

The foregoing description of polarity inversion operations is provided as one specific example of the configuration of the analog transformation circuitry 134 and 112. Of course, it should be understood that other analog and/or discrete operations may used in addition to, or as an alternative to, polarity inversion operations. For example, analog transformation circuitry 134 and/or 112 may be configured to perform 1's compliment operations and/or logical bit inversion operations and/or other inverse analog and/or digital operations (including other well-known and/or after-developed logical and/or analog operations).

The embodiments of FIG. 1 and operations of FIGS. 4-6 may be implemented in a variety of processing environments. For example, the operative circuitry of the near end device 102 may be formed in one or more integrated circuits 123. Likewise, the operative circuitry of the far end device 104 may be formed in one or more integrated circuits 150. "Integrated circuit", as used in any embodiment herein, means a semiconductor device and/or microelectronic device, such as, for example, but not limited to, a semiconductor integrated circuit chip. As used in any embodiment described herein, "circuitry" may comprise, for example, singly or in any combination, hardwired circuitry, programmable circuitry, state machine circuitry, and/or firmware that stores instructions executed by programmable circuitry. Any of the operative elements described in any embodiment herein may also be implemented in software, firmware, hardwired circuitry and/or any combination thereof, in whole or in part.

Additionally, the operative circuitry of the near end device 102 may be integrated within one or more integrated circuits of a computer node element, for example, integrated into a host processor (which may comprise, for example, an Intel® Pentium® microprocessor and/or an Intel® Pentium® D dual core processor and/or other processor that is commercially available from the Assignee of the subject application) and/or chipset processor and/or application specific integrated circuit (ASIC) and/or other integrated circuit. In still other embodiments, the operative circuitry provided herein may be utilized, for example, in host bus adapter (HBA) and/or in any system, processor, integrated circuit or methodology that may use a SATA communications protocol to exchange commands and data with one or more SATA-compliant devices.

Figure 7:
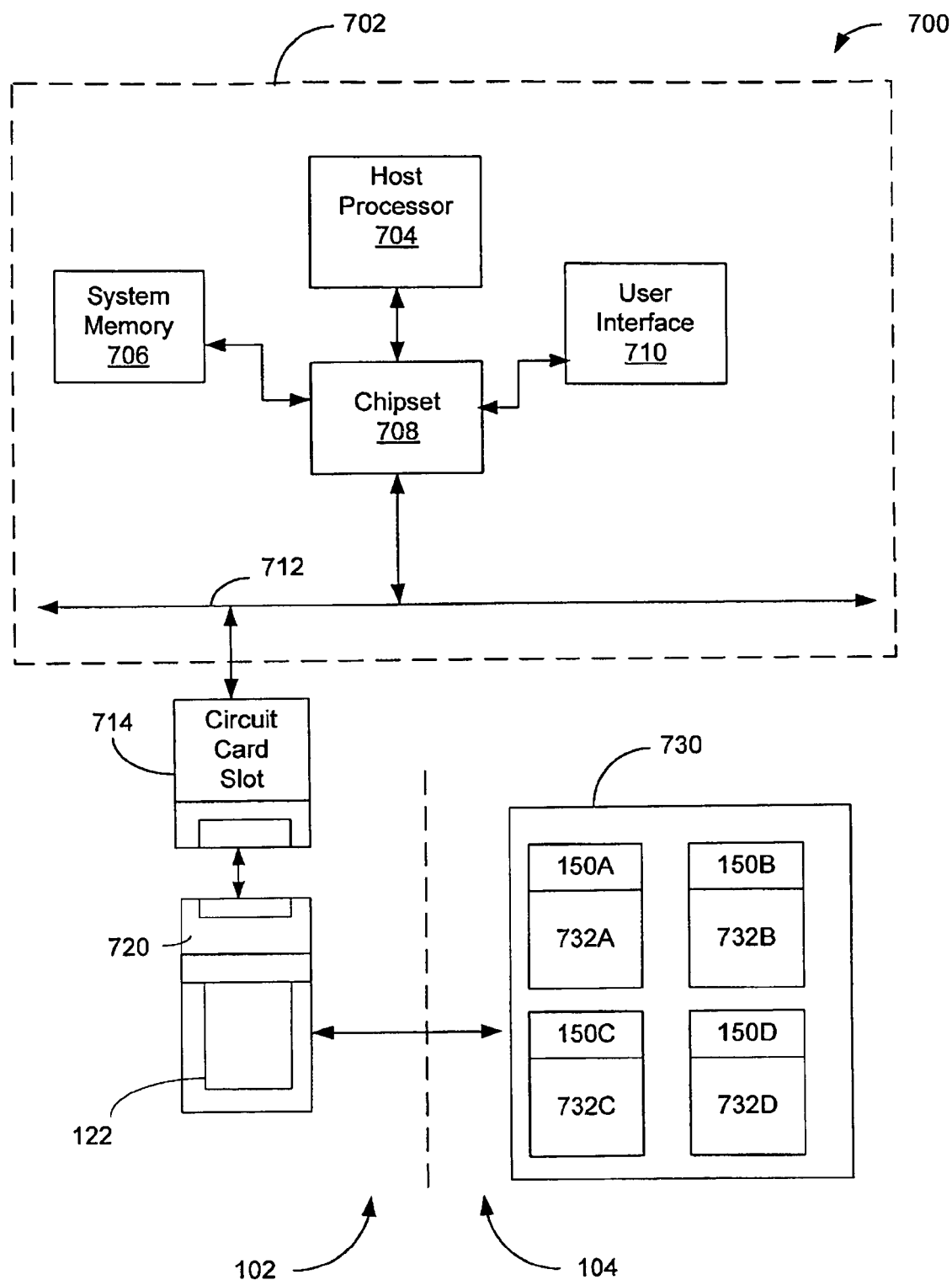
FIG. 7 is a diagram illustrating one exemplary system embodiment.

FIG. 7 depicts one exemplary system embodiment 700. System 700 may include a host system 702 that may include a host processor 704 coupled to a chipset 708. Host processor 704 may comprise, for example, an Intel® Pentium® IV microprocessor that is commercially available from the Assignee of the subject application. Of course, alternatively, host processor 704 may comprise another type of microprocessor, such as, for example, a microprocessor that is manufactured and/or commercially available from a source other than the Assignee of the subject application, without departing from this embodiment.

Chipset 708 may comprise a host bridge/hub system that may couple host processor 704, a system memory 706 and a user interface system 710 to each other and to a bus system 712. Chipset 708 may also include an input/output (I/O) bridge/hub system (not shown) that may couple the host bridge/bus system to bus 712. Chipset 708 may comprise integrated circuit chips, such as those selected from integrated circuit chipsets commercially available from the assignee of the subject application (e.g., graphics memory and I/O controller hub chipsets), although other integrated circuit chips may also, or alternatively be used, without departing from this embodiment. User interface system 710 may comprise, e.g., a keyboard, pointing device, and display system that may permit a human user to input commands to, and monitor the operation of, system 100 in FIG. 1.

Bus 712 may comprise a bus that complies with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, bus 712 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 712 may comprise other types and configurations of bus systems, without departing from this embodiment.

Controller card 720 may be coupled to and control the operation of mass storage 730. In this embodiment, mass storage 730 may comprise, e.g., one or more redundant arrays of independent disks (RAID) 732A, 732B, 732C, . . . , 732D. The RAID level that may be implemented by mass storage may be 0, 1, or greater than 1. Mass storage 730 may comprise, for example, one or more SATA-compliant disk mass storage devices.

Host Processor 704, system memory 706, chipset 708, bus 712, and circuit card slot 714 may be comprised in a single circuit board, such as, for example, a system motherboard. Mass storage 730 may be comprised in one or more respective enclosures that may be separate from the enclosure in which the motherboard and the components comprised in the motherboard are enclosed.

Integrated circuit 122 may be included on a circuit card 720. Integrated circuit 122 may operate in a manner described above with reference to FIGS. 1-6 to exchange data and/or commands with mass storage 730, using, e.g., a SATA communications protocol. Of course, alternatively, I/O controller card 720 may exchange data and/or commands with mass storage 730 using other and/or additional communication protocols, without departing from this embodiment.

In this embodiment, the near end device 102 may include circuit card 720 and host system 702. The far end device 104 may include one or more of the SATA devices 732A, 732B, 732C, . . . , 732D comprised in mass storage 730. Each of the SATA devices 732A, 732B, 732C, . . . , 732D may include an integrated circuit 150A, 150B, 150C, . . . , 150D, respectively, to control the operation of each respective device in a manner described above.

Accordingly, at least one embodiment described herein may provide an apparatus that includes a far end device configured to communicate with a near end device using a Serial ATA (SATA) communications protocol and to receive a SATA signal sequence having two bits, the state of which define at least one loopback mode. The far end device may be further configured to define a reserved and/or error state if both of the bits are set. The far end device may be further configured to process the two bits together to determine if the two bits are in a state that defines at least one loopback mode or if the two bits are set.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus, comprising:
a far end device configured to communicate with a near end device using a Serial ATA (SATA) communications protocol and to receive a SATA signal sequence having two bits, the state of which define at least one loopback mode; said far end device is further configured to define a reserved/error state if both of said bits are set; said far end device is further configured to process said two bits together to determine if said two bits are in a state that defines the at least one loopback mode or if said two bits are set.

2. The apparatus of claim 1, wherein:
said SATA signal sequence comprises a built-in self-test (BIST) Activate Frame Information Structure (FIS); said far end device is further configured to send an error primitive to said near end device if both of said bits are set.

3. The apparatus of claim 1, wherein:
said far end device comprises far end retimed transformation circuitry configured to transform a data stream sent by the near end device corresponding to a far end retimed loopback mode; said far end device is configured to enable said far end retimed transformation circuitry if said two bits define the far end retimed loopback mode.

4. The apparatus of claim 3, wherein:
said near end device comprises near end retimed transformation circuitry configured to transform the transformed data sent by the far end device and to recover the original data stream sent by the near end device; said near end device is configured to enable said near end retimed transformation circuitry if the far end device enables said far end retimed transformation circuitry.

5. The apparatus of claim 4, wherein:
said near end retimed transformation circuitry and said far end retimed transformation circuitry each comprise XOR circuitry configured to perform XOR operations on said data stream.

6. The apparatus of claim 1, wherein:
said far end device comprises far end analog transformation circuitry configured to transform signals corresponding to a far end analog loopback mode; said far end device is configured to enable said far end analog transformation circuitry if said two bits define the far end analog loopback mode.

7. The apparatus of claim 6, wherein:
said near end device comprises near end analog transformation circuitry configured to transform the signals received from said far end device to recover original signals sent by the near end device; said near end device is configured to enable said near end analog transformation circuitry if far end device enables said far end analog transformation circuitry.

8. The apparatus of claim 6, wherein:
said near end analog transformation circuitry and said far end analog transformation circuitry each comprise polarity inversion circuitry configured to perform polarity inversion operations on data signals received at each respective polarity inversion circuitry.

9. The apparatus of claim 1, wherein:
said far end device comprises at least one SATA disk device and said near end device comprises a host system configured to exchange commands and data with said far end device.

10. A method, comprising:
communicating, by a far end device with a near end device, using a Serial ATA (SATA) communications protocol;
receiving, by the far end device, a SATA signal sequence having two bits, the state of which define at least one loopback mode;
defining, by the far end device, a reserved/error state if both of said bits are set; and
processing, by said far end device, said two bits together to determine if said two bits are in a state that defines the at least one loopback mode or if said two bits are set.

11. The method of claim 10, further comprising:
sending, by said far end device, an error primitive to said near end device if both of said bits are set.

12. The method of claim 10, further comprising:
determining, by said far end device, if said two bits define a far end retimed loopback mode; and
transforming, by said far end device, a data stream corresponding to the far end retimed loopback mode if said two bits define the far end retimed loopback mode.

13. The method of claim 12, further comprising:
determining, by said near end device, if said far end device is capable of transforming said data stream; and
transforming, by said near end device, a data stream received from said far end device to recover original data sent by said near end device, if said far end device is capable of transforming said data stream in said far end device.

14. The method of claim 10, further comprising:
determining, by said far end device, if said two bits define a far end analog loopback mode; and
transforming, by said far end device, data signals corresponding to the far end analog loopback mode if said two bits define the far end analog loopback mode.

15. The method of claim 14, further comprising:
determining, by said near end device, if said far end device is capable of transforming said data signals; and
transforming, by said near end device, the data signals received from said far end device to recover original signals sent by the near end device, if said far end device is capable of transforming said data signals in said far end device.

16. An article comprising:
a storage medium having stored thereon instructions that when executed by a machine result in the following:
communicating, by a far end device with a near end device, using a Serial ATA (SATA) communications protocol;
receiving, by the far end device, a SATA signal sequence having two bits, the state of which define at least one loopback mode;
defining, by the far end device, a reserved/error state if both of said bits are set; and
processing, by said far end device, said two bits together to determine if said two bits are in a state that defines the at least one loopback mode or if said two bits are set.

17. The article of claim 16, wherein said instructions that when executed by said computer results in the following additional operations:
sending, by said far end device, an error primitive to said near end device if both of said bits are set.

18. The article of claim 16, wherein said instructions that when executed by said computer results in the following additional operations:
determining, by said far end device, if said two bits define a far end retimed loopback mode; and transforming, by said far end device, a data stream corresponding to a far end retimed loopback mode if said two bits define the far end retimed loopback mode.

19. The article of claim 18, wherein said instructions that when executed by said computer results in the following additional operations:
determining, by said near end device, if said far end device is capable of transforming said data stream; and
transforming, by said near end device, a data stream received from said far end device to recover original data sent by said near end device, if said far end device is capable of transforming said data stream in said far end device.

20. The article of claim 16, wherein said instructions that when executed by said computer results in the following additional operations:
determining, by said far end device, if said two bits define a far end analog loopback mode; and
transforming, by said far end device, data signals corresponding to the far end analog loopback mode if said two bits define the far end analog loopback mode.

21. The article of claim 20, wherein said instructions that when executed by said computer results in the following additional operations:
determining, by said near end device, if said far end device is capable of transforming said data signals; and
transforming, by said near end device, data signals received from said far end device to recover original signals sent by the near end device, if said far end device is capable of transforming said data signals in said far end device.

22. A system, comprising:
a near end device configured to communicate using a Serial ATA (SATA) communications protocol; and
a far end device configured to communicate with said near end device using said SATA communications protocol and to receive a SATA signal sequence from said near end device having two bits, the state of which define at least one loopback mode; said far end device is further configured to define a reserved/error state if both of said bits are set; said far end device is further configured to process said two bits together to determine if said two bits are in a state that defines the at least one loopback mode or if said two bits are set.

23. The system of claim 22, wherein:
said SATA signal sequence comprises a built-in self-test (BIST) Activate Frame Information Structure (FIS); said far end device is further configured to send an error primitive to said near end device if both of said bits are set.

24. The system of claim 22, wherein:
said far end device comprises far end retimed transformation circuitry configured to transform a data stream sent by the near end device corresponding to a far end retimed loopback mode; said far end device is configured to enable said far end retimed transformation circuitry if said two bits define the far end retimed loopback mode.

25. The system of claim 24, wherein:
said near end device comprises near end retimed transformation circuitry configured to transform the transformed data sent by the far end device and to recover the original data stream sent by the near end device; said near end device is configured to enable said near end retimed transformation circuitry if the far end device enables said far end retimed transformation circuitry.

26. The system of claim 25, wherein:
said near end retimed transformation circuitry and said far end retimed transformation circuitry each comprise XOR circuitry configured to perform XOR operations on said data stream.

27. The system of claim 22, wherein:
said far end device comprises far end analog transformation circuitry configured to transform signals corresponding to a far end analog loopback mode; said far end device is configured to enable said far end analog transformation circuitry if said two bits define the far end analog loopback mode.

28. The system of claim 27, wherein:
said near end device comprises near end analog transformation circuitry configured to transform signals received from said far end device to recover original signals sent by the near end device; said near end device is configured to enable said near end analog transformation circuitry if far end device enables said far end analog transformation circuitry.

29. The system of claim 28, wherein:
said near end analog transformation circuitry and said far end analog transformation circuitry each comprise polarity inversion circuitry configured to perform polarity inversion operations on data signals received at each respective polarity inversion circuitry.

30. The system of claim 22, wherein:
said far end device comprises at least one SATA disk device and said near end device comprises a host system configured to exchange commands and data with said far end device.

* * * * *